(12) United States Patent
Takizawa

(10) Patent No.: US 9,214,878 B2
(45) Date of Patent: Dec. 15, 2015

(54) MULTILEVEL POWER CONVERTER CIRCUIT

(71) Applicant: FUJI ELECTRIC CO., LTD., Kawasaki-shi (JP)

(72) Inventor: Satoki Takizawa, Hino (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 140 days.

(21) Appl. No.: 14/344,059

(22) PCT Filed: Sep. 24, 2012

(86) PCT No.: PCT/JP2012/006044
§ 371 (c)(1),
(2) Date: Mar. 10, 2014

(87) PCT Pub. No.: WO2013/105156
PCT Pub. Date: Jul. 18, 2013

(65) Prior Publication Data
US 2014/0339899 A1    Nov. 20, 2014

(30) Foreign Application Priority Data

Jan. 13, 2012   (JP) ................................ 2012-004723

(51) Int. Cl.
*H02M 7/537*    (2006.01)
*H02M 7/487*    (2007.01)
(Continued)

(52) U.S. Cl.
CPC .............. *H02M 7/537* (2013.01); *H02M 7/217* (2013.01); *H02M 7/487* (2013.01); *H02P 27/06* (2013.01); *Y10T 307/609* (2015.04)

(58) Field of Classification Search
CPC ........... H02M 7/42; H02M 7/44; H02M 7/48; H02M 7/483; H02M 7/487; H02M 7/49; H02M 7/537; H02M 7/5387
USPC ............. 363/16–17, 34–43, 95–98, 131–132, 363/135–136
See application file for complete search history.

(56) References Cited

U.S. PATENT DOCUMENTS

| 6,278,626 | B1 * | 8/2001 | Teichmann | ......... | H02M 7/4826 363/135 |
| 6,480,403 | B1 | 11/2002 | Bijlenga | | |

(Continued)

FOREIGN PATENT DOCUMENTS

| JP | 2002-542751 A | 12/2002 |
| JP | 2008-503194 A | 1/2008 |

(Continued)

OTHER PUBLICATIONS

Gerster, Christian, "Fast high-power/High-voltage Switch Using Series-connected IGBTs with Active Gate-controlled Voltage-balancing", Applied Power Electronics Conference and Exposition (APEC) Conference Proceedings, Feb. 13, 1994, p. 469-472, ISBN 0-7803-1456-5.

*Primary Examiner* — Timothy J Dole
*Assistant Examiner* — Ivan Laboy Andino
(74) *Attorney, Agent, or Firm* — Rabin & Berdo, P.C.

(57) ABSTRACT

A multilevel power converter circuit driven by two direct current power supplies in series includes a first semiconductor switch series circuit that combines a series circuit of 2n IGBTs connected between positive and negative electrodes with a capacitor, a second semiconductor switch series circuit that combines a series circuit of 2n–2 IGBTs connected between the emitter of a first IGBT of the first semiconductor switch series circuit and the collector of a $2n^{th}$ IGBT with a capacitor, and a bidirectional switch connected between an intermediate point of the second semiconductor switch series circuit and an intermediate point of the direct current power supply, to reduce a voltage change in the alternating current output when semiconductor switches are switching.

7 Claims, 13 Drawing Sheets

(51) Int. Cl.
*H02M 7/217* (2006.01)
*H02P 27/06* (2006.01)

(56) References Cited

U.S. PATENT DOCUMENTS

| | | |
|---|---|---|
| 6,519,169 B1 | 2/2003 | Asplund et al. |
| 7,471,532 B1 | 12/2008 | Salama et al. |
| 2007/0025126 A1* | 2/2007 | Barbosa ............ H02M 7/483 363/60 |
| 2007/0235293 A1* | 10/2007 | Steimer ............ H02M 7/483 200/2 |
| 2008/0204959 A1 | 8/2008 | Knapp et al. |
| 2008/0315859 A1 | 12/2008 | Ponnaluri et al. |
| 2014/0132068 A1* | 5/2014 | Zabaleta Maeztu .. H02M 7/483 307/26 |

FOREIGN PATENT DOCUMENTS

| | | |
|---|---|---|
| JP | 2009-525717 A | 7/2009 |
| JP | 2010-246189 A | 10/2010 |
| WO | WO-02/063757 A1 | 8/2002 |
| WO | WO-2011/073466 A1 | 6/2011 |

* cited by examiner

FIG. 2

| Output voltage | 3Ed | 2Ed | | | Ed | | | | | 0 | | | | | |
|---|---|---|---|---|---|---|---|---|---|---|---|---|---|---|---|
| Output pattern | A | A | B | C | A | B | C | D | E | A | B | C | D | E | F |
| | 3 | 3−1b | 3−2+1b | 0+2 | 3−2 | 0+1b | 0+2−1b | 0+1a | 0−1a+2 | 0p | 0n | 1a−1b | −1a+1b | 1a−2+1b | −1a+2−1b |
| IGBT1 | O | O | O | x | O | x | x | x | x | x | x | x | x | x | x |
| IGBT2 | O | O | x | O | x | x | O | O | O | x | O | x | O | x | O |
| IGBT3 | O | x | O | x | x | O | x | O | O | x | O | x | O | O | x |
| IGBT4 | x | O | x | x | O | x | O | x | x | O | x | O | x | O | O |
| IGBT5 | x | x | O | x | O | O | x | x | x | O | x | O | x | O | x |
| IGBT6 | x | x | x | x | x | x | x | O | O | x | O | x | x | x | x |
| IGBT7 | x | x | x | O | x | x | O | x | O | x | O | x | O | O | x |
| IGBT8 | O | O | O | O | O | O | O | O | O | O | x | O | x | O | O |
| IGBT9 | O | x | O | O | O | O | x | O | O | O | x | O | x | x | x |
| IGBT10 | O | O | x | O | x | O | O | x | O | O | O | O | O | O | O |
| IGBT11 | x | x | O | O | O | O | O | O | O | O | O | O | O | O | O |
| IGBT12 | O | O | O | O | O | O | O | O | O | O | O | O | O | O | O |

O:IGBT on-state, x:IGBT off-state

FIG. 3

| Output voltage | −Ed | | | | | −2Ed | | | −3Ed |
|---|---|---|---|---|---|---|---|---|---|
| | A | B | C | D | E | A | B | C | A |
| Output pattern | −3+2 | 0−1b | 0−2+1b | 0−1a | 0+1a−2 | −3+1b | −3+2−1b | 0−2 | −3 |
| IGBT1 | x | x | x | x | x | x | x | x | x |
| IGBT2 | O | O | x | x | x | x | O | x | x |
| IGBT3 | O | x | O | x | x | O | x | x | x |
| IGBT4 | x | O | x | O | O | x | O | O | O |
| IGBT5 | x | x | O | x | O | O | x | O | O |
| IGBT6 | O | O | O | x | x | O | O | O | O |
| IGBT7 | O | x | O | O | O | x | x | x | O |
| IGBT8 | O | x | x | x | x | x | x | x | x |
| IGBT9 | x | x | x | O | x | x | x | x | x |
| IGBT10 | x | O | O | O | O | O | x | O | O |
| IGBT11 | O | O | O | O | O | x | x | O | O |
| IGBT12 | x | O | O | O | O | x | x | O | x |

O: IGBT on-state, x: IGBT off-state

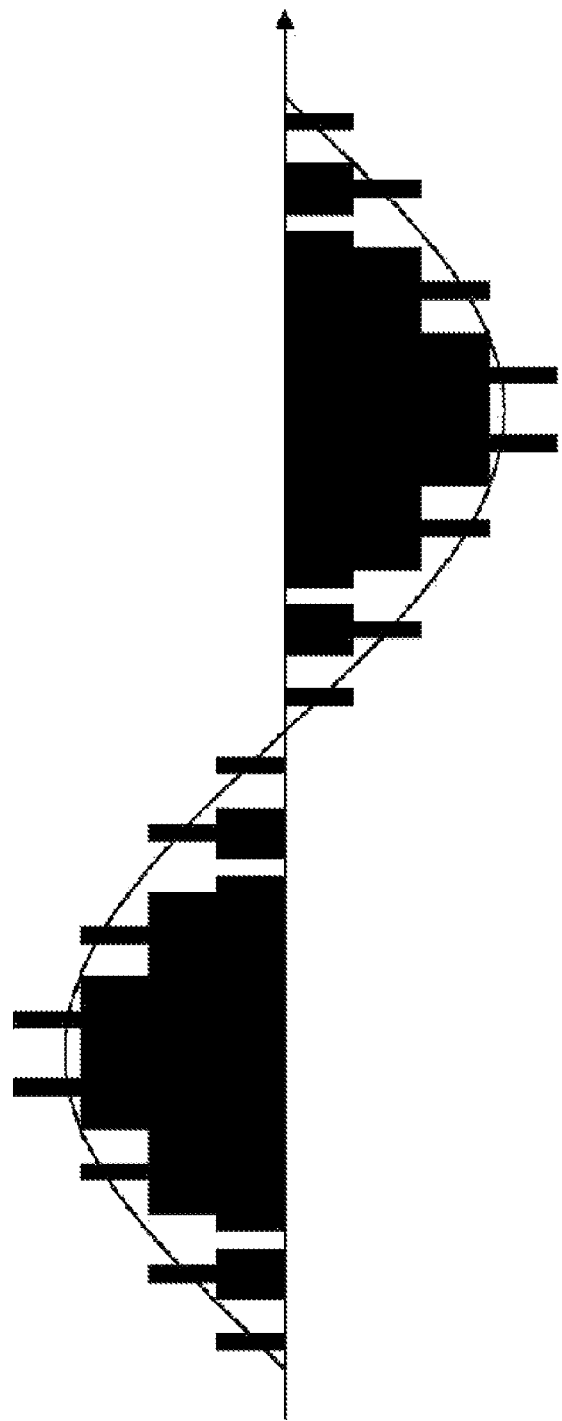

MULTILEVEL POWER CONVERTER CIRCUIT

TECHNICAL FIELD

The invention relates to a method of configuring a multilevel power converter circuit that converts from a direct current to an alternating current with few low-order harmonics, or converts an alternating current to a direct current while reducing the distortion of an alternating current input waveform.

BACKGROUND ART

FIG. 7 shows a circuit example of a five level inverter described in JP-T-2009-525717, which is a power converter circuit that converts from direct current to alternating current.

Direct current power supplies 60 and 61 (2Ed×2) are connected in series, and have a positive electrode potential P, a negative electrode potential N, and an intermediate point potential M. Generally, when configuring this direct current power supply from an alternating current power supply system, it is possible to configure by connecting an unshown rectifier and large capacity capacitor in series, or the like.

A one-phase (U-phase) circuit configuration (phase arm) Ua has an internal configuration with four semiconductor switches 51 and 54 are formed of IGBTs and diodes connected in series between the P side potential and N side potential. Two semiconductor switches 55 and 56 are formed of IGBTs and diodes connected in series between a connection point of the semiconductor switches 51 and 52 and a connection point of the semiconductor switches 53 and 54.

An anti-parallel circuit of IGBTs 57 and 58 is a bidirectional semiconductor switch connected between the M potential of the direct current power supply and a connection point of the semiconductor switches 55 and 56, and can be configured by connecting IGBTs (57 and 58) having reverse breakdown voltage in anti-parallel, as shown in FIG. 7, or by combining IGBTs (Q1, Q2) that do not have reverse breakdown voltage with diodes (D1, D2), as shown in FIG. 10A to 10C. FIG. 10A is a configuration wherein a series circuit of the IGBT Q1 and diode D1 and a series circuit of the IGBT Q2 and diode D2 are connected in anti-parallel. FIG. 10B is a configuration wherein the IGBT Q1 to which the diode D2 is connected in anti-parallel and the IGBT Q2 to which the diode D1 is connected in anti-parallel are connected in anti-series with a common collector, while FIG. 10C is a configuration wherein the IGBTs Q1 and Q2 are connected in anti-series with a common emitter. Apart from these configurations, there is a configuration using a diode bridge circuit and one IGBT, and the like.

A capacitor 59 is called a flying capacitor, has an average voltage across the capacitor 59 controlled to Ed, and an output of an intermediate potential Ed of the direct current power supply 2Ed realized by utilizing a charging and discharging phenomenon of the capacitor 59. These circuit groups Ua form one phase, and by connecting three units (Ua, Ub, and Uc) in parallel, a three-phase inverter circuit is configured.

An alternating current motor 62 is a load of the system. By adopting this circuit configuration, the potential of an alternating current output terminal of the converter is such that, by utilizing the P potential, N potential, and M potential of the direct current power supply, and a turning on and off of the semiconductor switches and the voltage of the capacitor 59, an intermediate potential of (P−Ed) and (N+Ed) can be output, because of which the five level output inverter is formed.

For example, five levels of voltage are output by operations whereby the IGBTs 51 and 52 are turned on when a voltage of 2Ed is output, the IGBTs 51 and 53 are turned on when a voltage of Ed is output, the IGBTs 58, 56, and 53 are turned on when a zero voltage (the M potential voltage) is output, the IGBTs 53, 55, and 57 are turned on when −Ed is output, the IGBTs 53 and 54 are turned on when −2Ed is output, and the like. There are also other operating patterns, but details will be omitted. Characteristics are that the voltage Ed, which is one-half of the direct current power supply 2Ed, is obtained by subtracting the voltage Ed of the capacitor 59 from the voltage 2Ed of the P side direct current power supply 60, and the voltage −Ed is obtained by subtracting the voltage (−Ed) of the capacitor 59 from the voltage (−2Ed) of the N side direct current power supply 61.

FIG. 13 shows a waveform example of an output line voltage (Vout). The waveform is configured of five levels of voltage and, as low-order harmonics are reduced and the switching loss of the semiconductor switches can be reduced in comparison with a two level type of inverter, construction of a highly efficient system is possible.

Also, FIG. 8 shows a circuit forming the basic form of a multilevel power converter circuit, such as the five level converter circuit of FIG. 7. As the numbers of parts with the same functions are the same as in the circuit of FIG. 7, a description will be omitted. A multilevel circuit can be realized by adding a converter circuit between terminals A and B in the drawing.

As an application circuit thereof, FIG. 9 shows a circuit example of a seven level inverter. This circuit is such that an alternating current output having seven levels of potential is possible by IGBTs 1 to 6 being connected as semiconductor switches between the positive electrode and negative electrode of a voltage (3Ed×2) of direct current power supplies 16 and 17 connected in series, a capacitor 13 charged to one unit of voltage (Ed) being connected between the collector of an IGBT 3 and the emitter of an IGBT 4, and a capacitor 14 charged to two units of voltage (2Ed) being connected between the collector of an IGBT 2 and the emitter of an IGBT 5.

Operations outputting a seven level voltage can be thought to be the same as in the case of five levels. For example, seven levels of voltage are output by operations whereby the IGBTs 1, 2, and 3 are turned on when a voltage of 3Ed is output, the IGBTs 1, 2, and 4 are turned on when a voltage of 2Ed is output, the IGBTs 1, 5, and 4 are turned on when a voltage of Ed is output, the IGBTs 1, 56, 5, and 4 are turned on when a zero voltage (the M potential voltage) is output, the IGBTs 4, 5, 55, and 11 are turned on when −Ed is output, the IGBTs 4, 2, 55, and 11 are turned on when −2Ed is output, the IGBTs 4, 5, and 6 are turned on when −3Ed is output, and the like. There are also other patterns, but details will be omitted. Characteristics are that the voltage Ed is obtained by subtracting the voltage 2Ed of the capacitor 14 from the voltage 3Ed of the P side direct current power supply 16, the voltage 2Ed is obtained by subtracting the voltage Ed of the capacitor 13 from the voltage 3Ed of the direct current power supply 16, the voltage −Ed is obtained by subtracting the voltage (−2Ed) of the capacitor 14 from the voltage (−3Ed) of the N side direct current power supply 17, and the voltage −2Ed is obtained by subtracting the voltage (−Ed) of the capacitor 13 from the voltage (−3Ed) of the N side direct current power supply 17.

SUMMARY OF INVENTION

Technical Problem

As heretofore described, the operations of the seven level inverter circuit shown in FIG. 9 are such that the voltage fluctuation is two units (2Ed) when the switching element 55 or 56 is switching. In general, when a high voltage fluctuation appears in the output waveform, a high micro-surge voltage in accordance with the voltage is generated in the load side alternating current motor, and there is concern that a dielectric breakdown problem will occur as a result of this.

FIGS. 11A and 11B are diagrams of the operation of the circuit of FIG. 9. FIG. 11A shows a condition wherein the switching elements 12, 56, 5, and 4 are energized in a condition wherein the M potential is being output. On the IGBT 56 being turned off from this condition, there is a commutation to the IGBT 55 and capacitor 14 side, as shown in FIG. 11B, because of which a voltage of the M point potential (zero)−2Ed is output to an output, and the voltage fluctuation range at this time is 2Ed.

When selecting elements appropriate for a one unit voltage fluctuation (Ed) as the IGBTs 55 and 56, it is necessary to connect two elements in series, in which case, when switching the IGBTs connected in series, synchronicity is an essential condition for dividing the voltage equally when turning off. As means of realizing this, the kind of ancillary circuit shown in "Fast High-power/High-voltage Switch Using Series-connected IGBTs with Active Gate-controlled Voltage-balancing", APEC1994, pages 469 to 472 is necessary, which is a factor in increasing cost as a result.

An object of the invention is to eliminate the heretofore described problems. That is, the object is that voltage fluctuation due to IGBT switching is one unit (Ed) in all operating modes, and that there is no longer a need for synchronized switching of IGBTs connected in series.

Herein, the IGBTs 1 and 6 also need to be connected in series when employing elements with a breakdown voltage appropriate for a one unit voltage fluctuation, but as the change in output voltage when these IGBTs switch is a voltage change of one unit (Ed), there is no problem of micro-surge, it is not essential that elements connected in series are switched simultaneously, and the voltage change will not lead to element destruction.

Solution to Problem

In order to solve the heretofore described problems, a first aspect of the invention is a multilevel power converter circuit that converts from direct current to alternating current or from alternating current to direct current, including a direct current power supply series circuit wherein two direct current power supplies are connected in series, a first semiconductor switch series circuit, connected between the positive terminal and negative terminal of the direct current power supply series circuit, wherein 2n (n is an integer of 3 or higher) semiconductor switches wherein diodes are connected in anti-parallel are connected in series, n−1 capacitors connected one each between the collector of the $n^{th}$ semiconductor switch of the first semiconductor switch series circuit from the positive terminal of the direct current power supply series circuit and the emitter of the $(n+1)^{th}$ semiconductor switch and between the collector of the $n^{th}$−m semiconductor switch and the emitter of the $(n+m+1)^{th}$ semiconductor switch, wherein m is an integer of from 1 to n−2, a second semiconductor switch series circuit wherein 2n−2 semiconductor switches wherein diodes are connected in anti-parallel are connected in series connected between the emitter of the first semiconductor switch of the first semiconductor switch series circuit from the positive terminal of the direct current power supply series circuit and the collector of the $2n^{th}$ semiconductor switch, n−2 capacitors connected one each between the collector of the $(n-1)^{th}$ semiconductor switch from the positive side of the second semiconductor switch series circuit and the emitter of the $n^{th}$ semiconductor switch and, when n is four or higher, between the collector of the $(n-m)^{th}$ semiconductor switch and the emitter of the $(n+m-1)^{th}$ semiconductor switch, wherein m is an integer of from 2 to n−2, and a bidirectional switch capable of bidirectional switching connected between the emitter of the $(n-1)^{th}$ semiconductor switch of the second semiconductor switch series circuit and an intermediate potential point of the direct current power supply series circuit.

A second aspect of the invention is such that the multilevel power converter circuit according to the first aspect of the invention configures a power converter circuit having a 2n+1 level of voltage change, wherein n is an integer of 3 or higher.

A third aspect of the invention is such that the multilevel power converter circuit according to the first or second aspect of the invention is such that the first or $2n^{th}$ semiconductor switch from the positive terminal of the direct current power supply series circuit of the first semiconductor switch series circuit is of a configuration wherein a plurality of switches are connected in series.

Advantageous Effects of Invention

The invention includes a direct current power supply series circuit wherein two direct current power supplies are connected in series, a first semiconductor switch series circuit, connected between the positive terminal and negative terminal of the direct current power supply series circuit, wherein 2n (n is an integer of 3 or higher) semiconductor switches wherein diodes are connected in anti-parallel are connected in series, n−1 capacitors connected one each between the collector of the $n^{th}$ semiconductor switch of the first semiconductor switch series circuit from the positive terminal of the direct current power supply series circuit and the emitter of the $(n+1)^{th}$ semiconductor switch and between the collector of the $(n-m)^{th}$ semiconductor switch and the emitter of the $(n+m+1)^{th}$ semiconductor switch, wherein m is an integer of from 1 to n−2, a second semiconductor switch series circuit wherein 2n−2 semiconductor switches wherein diodes are connected in anti-parallel are connected in series connected between the emitter of the first semiconductor switch of the first semiconductor switch series circuit from the positive terminal of the direct current power supply series circuit and the collector of the $2n^{th}$ semiconductor switch, n−2 capacitors connected one each between the collector of the $(n-1)^{th}$ semiconductor switch from the positive side of the second semiconductor switch series circuit and the emitter of the $n^{th}$ semiconductor switch and, when n is four or higher, between the collector of the $(n-m)^{th}$ semiconductor switch and the emitter of the $(n+m-1)^{th}$ semiconductor switch, wherein m is an integer of from 2 to n−2, and a bidirectional switch capable of bidirectional switching connected between the emitter of the $(n-1)^{th}$ semiconductor switch of the second semiconductor switch series circuit and an intermediate potential point of the direct current power supply series circuit, and an alternating current output voltage having a 2n+1 level of voltage change is output.

As a result of this, the output voltage change when switching is one unit (Ed), which is small compared with that heretofore known, micro-surge voltage is no longer generated in a load side alternating current motor or the like, and dielectric breakdown problems cease to occur. Also, by the first and $2n^{th}$ semiconductor switches from the positive terminal of the direct current power supply series circuit of the first semiconductor switch series circuit being of a configuration wherein a plurality of switches are connected in series, the voltage applied to each semiconductor switch of the switching circuit is of one unit, and there is no need for an ancillary circuit or the like for equalizing the voltage division when connecting in series.

BRIEF DESCRIPTION OF DRAWINGS

FIG. 2 is an operation diagram A illustrating a first switching operation.

FIG. 3 is an operation diagram B illustrating a first switching operation.

FIG. 13 is an output voltage waveform example of a five level inverter.

DESCRIPTION OF EMBODIMENTS

Main points of the invention are that the invention includes a direct current power supply series circuit wherein two direct current power supplies are connected in series, a first semiconductor switch series circuit wherein 2n (n is an integer of 3 or higher) semiconductor switches are connected in series connected between the positive terminal and negative terminal of the direct current power supply series circuit, n−1 capacitors connected one each between the collector of the $n^{th}$ semiconductor switch of the first semiconductor switch series circuit from the positive terminal of the direct current power supply series circuit and the emitter of the $(n+1)^{th}$ semiconductor switch and between the collector of the $(n-m)^{th}$ semiconductor switch and the emitter of the $(n+m+1)^{th}$ semiconductor switch, wherein m is an integer of from 1 to n−2, a second semiconductor switch series circuit wherein 2n−2 semiconductor switches are connected in series connected between the emitter of the first semiconductor switch of the first semiconductor switch series circuit from the positive terminal of the direct current power supply series circuit and the collector of the $2n^{th}$ semiconductor switch, n−2 capacitors connected one each between the collector of the $(n-1)^{th}$ semiconductor switch from the positive side of the second semiconductor switch series circuit and the emitter of the $n^{th}$ semiconductor switch and, when n is four or higher, between the collector of the $(n-m)^{th}$ semiconductor switch and the emitter of the $(n+m-1)^{th}$ semiconductor switch, wherein m is an integer of from 2 to n−2, and a bidirectional switch connected between the emitter of the $(n-1)^{th}$ semiconductor switch of the second semiconductor switch series circuit and an intermediate potential point of the direct current power supply series circuit, and that an alternating current output voltage having a 2n+1 level of voltage change is output.

Example 1

Figure 1:
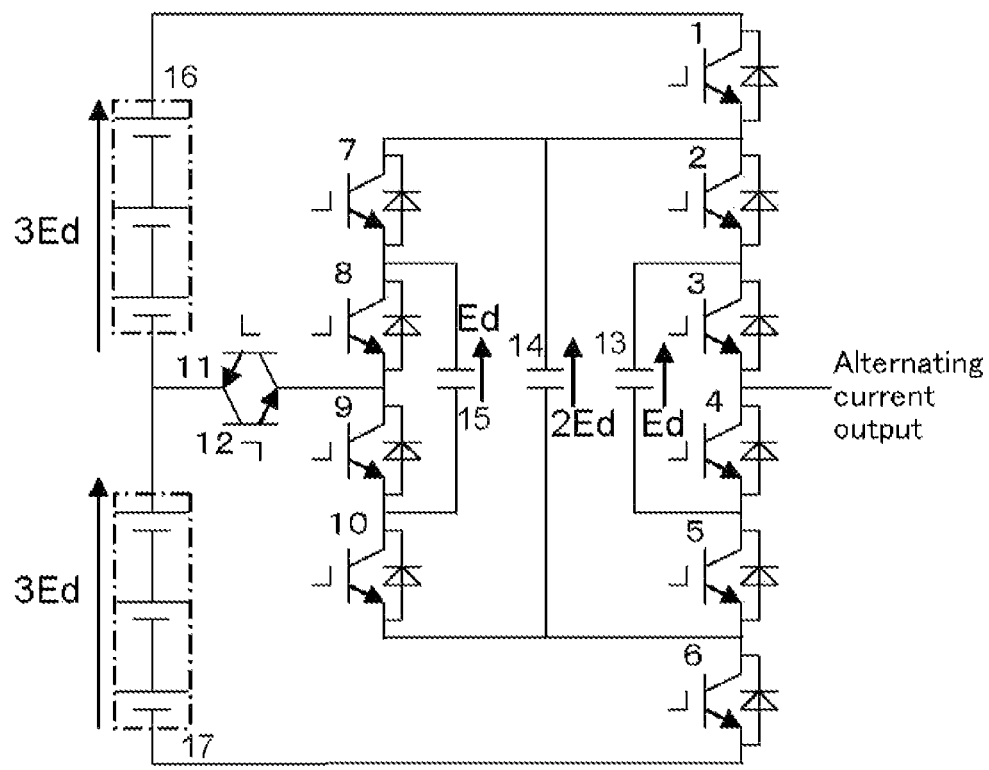
FIG. 1 is a circuit diagram showing a first example of the invention.

FIG. 1 shows a first example of the invention. This is an example of a power converter circuit that generates an alternating current output voltage configured of seven levels of voltage waveform from a series connection circuit of two direct current power supplies providing 3Ed (3 units) of voltage. It is a configuration example wherein IGBTs are used as semiconductor switches.

Figure 8:
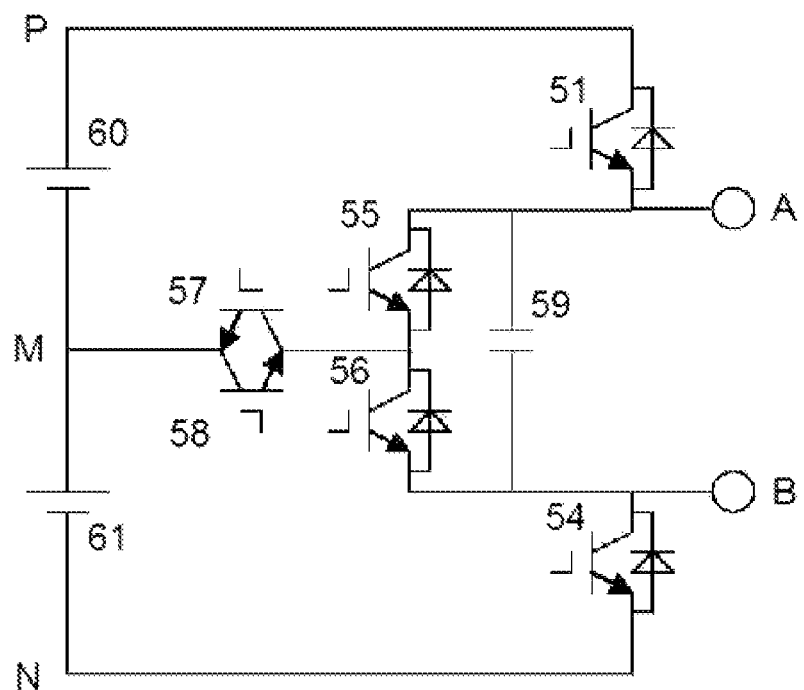
FIG. 8 is a basic circuit of a heretofore known multilevel circuit.
Figure 9:
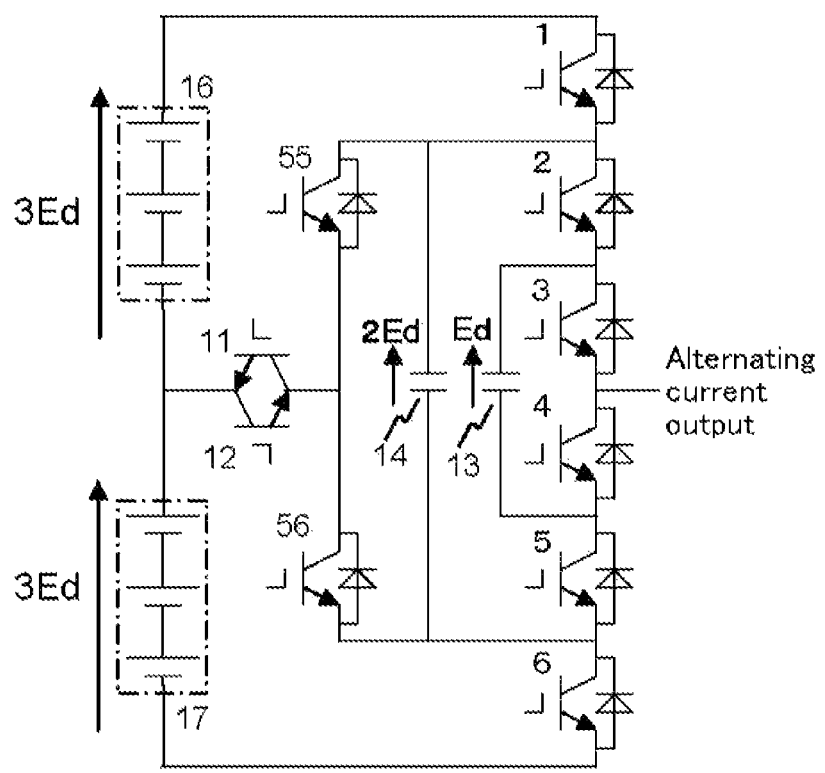
FIG. 9 is a heretofore known example of a seven level converter circuit.
Figure 10A:
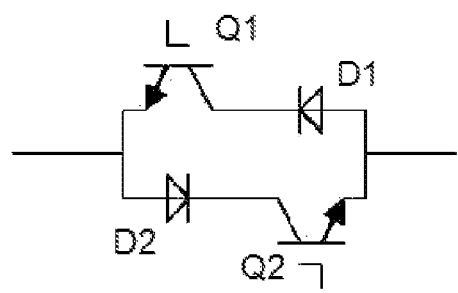
FIGS. 10A, 10B and 10C are circuit examples of a bidirectional switch.
Figure 10B:
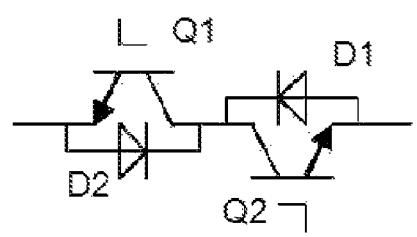
Figure 10C:
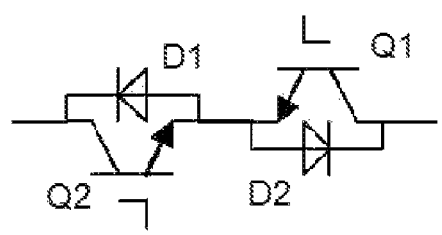
Figure 11A:
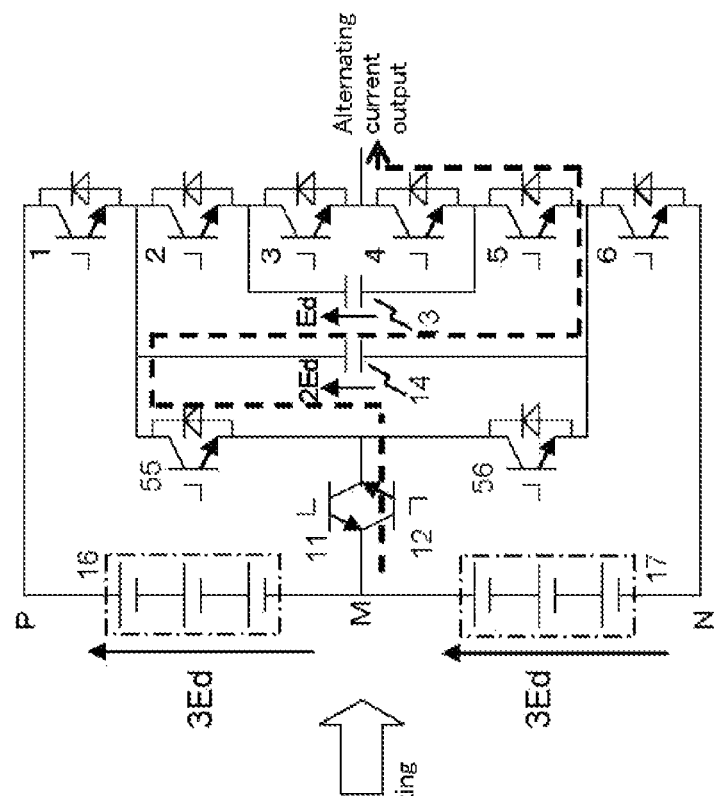
FIGS. 11A and 11B are examples showing operation of the heretofore known seven level converter circuit.
Figure 11B:
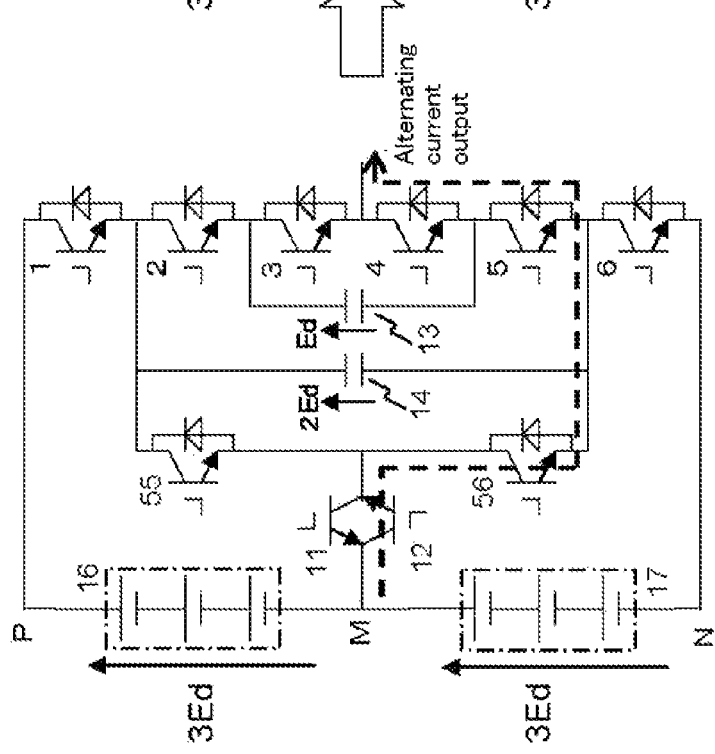

As opposed to a seven level converter circuit shown in FIG. 9 using a basic circuit of a heretofore known multilevel converter circuit (FIG. 8), the configuration is such that an IGBT 55 of a second semiconductor switch series circuit is changed to a series circuit of IGBTs 7 and 8 and an IGBT 56 to a series circuit of IGBTs 9 and 10, and furthermore, a capacitor 15 is connected between a connection point of the IGBTs 7 and 8 and a connection point of the IGBTs 9 and 10.

FIGS. 2 and 3 show operating pattern diagrams. FIG. 2 is the output operating pattern of IGBTs 1 to 12 when potentials of 3Ed, 2Ed, Ed, and 0 are output as the alternating current output voltage, while FIG. 3 is the output operating pattern of the IGBTs 1 to 12 when potentials of −Ed, −2Ed, and −3Ed are output as the alternating current output voltage. O represents an on-state while x represents an off-state. Hereafter, output operating pattern will be abbreviated to output pattern.

In FIG. 2, although it is sufficient that the IGBTs 1 to 3 are in an on-state when 3Ed is output, the IGBTs 9, 10, and 12 are also turned on in order that a commutation operation at the next timing is carried out smoothly.

There are three kinds of output pattern, A to C, when 2Ed is output. The output pattern A is a pattern wherein the IGBTs 1, 2, and 4 are turned on and the voltage 2Ed is output by a voltage Ed of a capacitor 13 being subtracted from a voltage 3Ed of a direct current power supply 16 (expressed as 3−1b), and the IGBTs 9, 10, and 12 are turned on in order that a commutation operation at the next timing is carried out smoothly. The output pattern B is a pattern wherein the IGBTs 1, 3, and 5 are turned on and the voltage 2Ed is output by a voltage 2Ed of a capacitor 14 being subtracted from the voltage 3Ed of the direct current power supply 16 and the voltage Ed of the capacitor 13 being added (expressed as 3−2+1b), and the IGBTs 9, 10, and 12 are turned on in order that a commutation operation at the next timing is carried out smoothly. The output pattern C is a pattern wherein the IGBTs 2, 3, 9, 10, 11, and 12 are turned on and the voltage 2Ed is output by the voltage (2Ed) of the capacitor 14 being added to an M potential (zero) (expressed as 0+2).

There are five kinds of output pattern, A to E, that output Ed, and six kinds of operating pattern, A to F, that output zero, and as the operations thereof can be thought to be the same as in the description of the output patterns that output 3Ed or 2Ed, a description will be omitted.

FIG. 3 shows output patterns when a negative voltage is output as the alternating current output voltage. Although it is sufficient that the IGBTs 4, 5, and 6 are in an on-state when −3Ed is output, the IGBTs 7, 8, and 11 are also turned on in order that a commutation operation at the next timing is carried out smoothly.

There are three kinds of output pattern, A to C, when −2Ed is output. The output pattern A is a pattern wherein the IGBTs 3, 5, and 6 are turned on and the voltage −2Ed is output by the voltage Ed of the capacitor 13 being added to a voltage −3Ed of a direct current power supply 17 (expressed as −3+1b), and the IGBTs 7, 8, and 11 are also turned on in order that a commutation operation at the next timing is carried out smoothly. The output pattern B is a pattern wherein the IGBTs 2, 4, and 6 are turned on and the voltage −2Ed is output by the voltage (2Ed) of the capacitor 14 being added to the voltage (−3Ed) of the direct current power supply 17 and the voltage (Ed) of the capacitor 13 being subtracted (expressed as −3+2−1b), and the IGBTs 7, 8, and 11 are also turned on in order that a commutation operation at the next timing is carried out smoothly. The output pattern C is a pattern wherein the IGBTs 4, 5, 7, 8, 1, and 12 are turned on and a voltage wherein the voltage (2Ed) of the capacitor 14 is subtracted from an M point potential (zero) of the direct current power supply is output (expressed as 0−2).

There are five kinds of output pattern, A to E, that output −Ed, and as the operations thereof can be thought to be the same as in the description of the output patterns that output −3Ed or −2Ed, a description will be omitted.

Figure 12A:
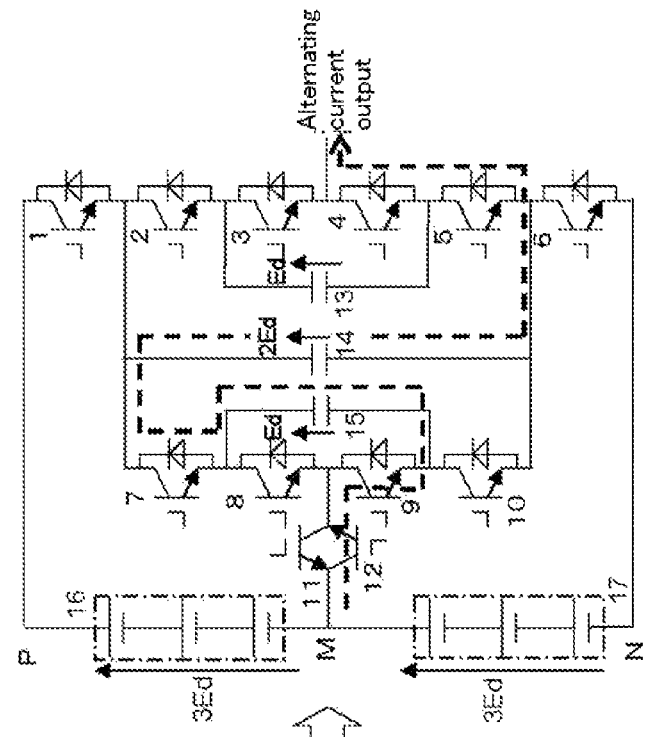
FIGS. 12A and 12B are examples showing operation of a seven level converter circuit of the invention.
Figure 12B:
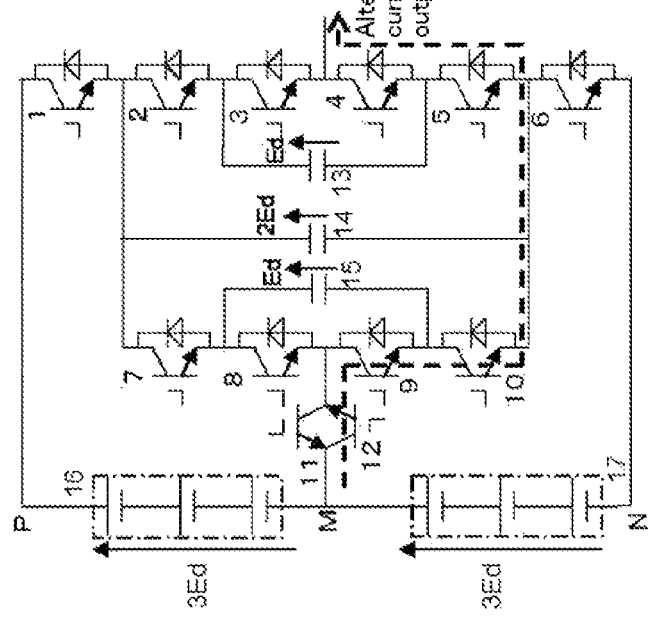

Adopting this circuit configuration means that, when outputting a negative voltage from a condition wherein the M potential (zero) is being output (the IGBTs 12, 9, 10, 5, and 4 are in an on-state), as shown in FIGS. 12A and 12B, a commutation to the IGBT 7 and capacitor 15 side is carried out by the IGBT 10 being turned off, as shown in FIG. 12B, and a potential of M−Ed (specifically, M+Ed−2Ed) is output to an output. The potential fluctuation at this time is equivalent to one unit (Ed).

Figure 5:
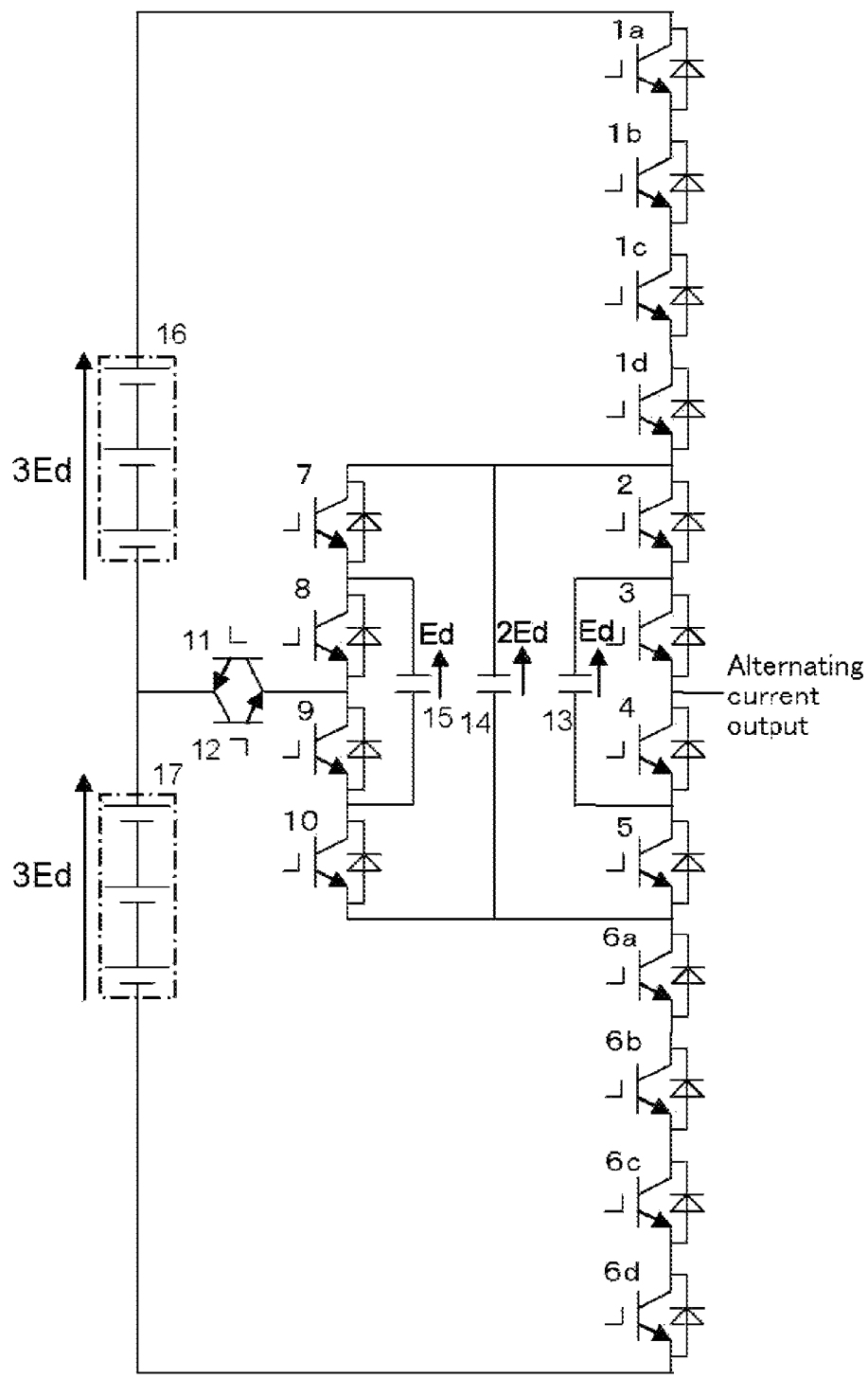
FIG. 5 is a modification example of the first example of the invention.

FIG. 5 shows a modification example of the first example (the example of the seven level power converter circuit) when the breakdown voltages of the IGBTs applied are all equal. This case is an example wherein the IGBT 1 of a first semiconductor switch series circuit in FIG. 1 is changed to a four switch series circuit of IGBTs 1a to 1d, and the IGBT 6 is changed to a four switch series circuit of IGBTs 6a to 6d. As it is possible to use elements with the same breakdown voltage for all the IGBTs, the device configuration is simplified, and part management becomes easier.

Example 2

Figure 4:
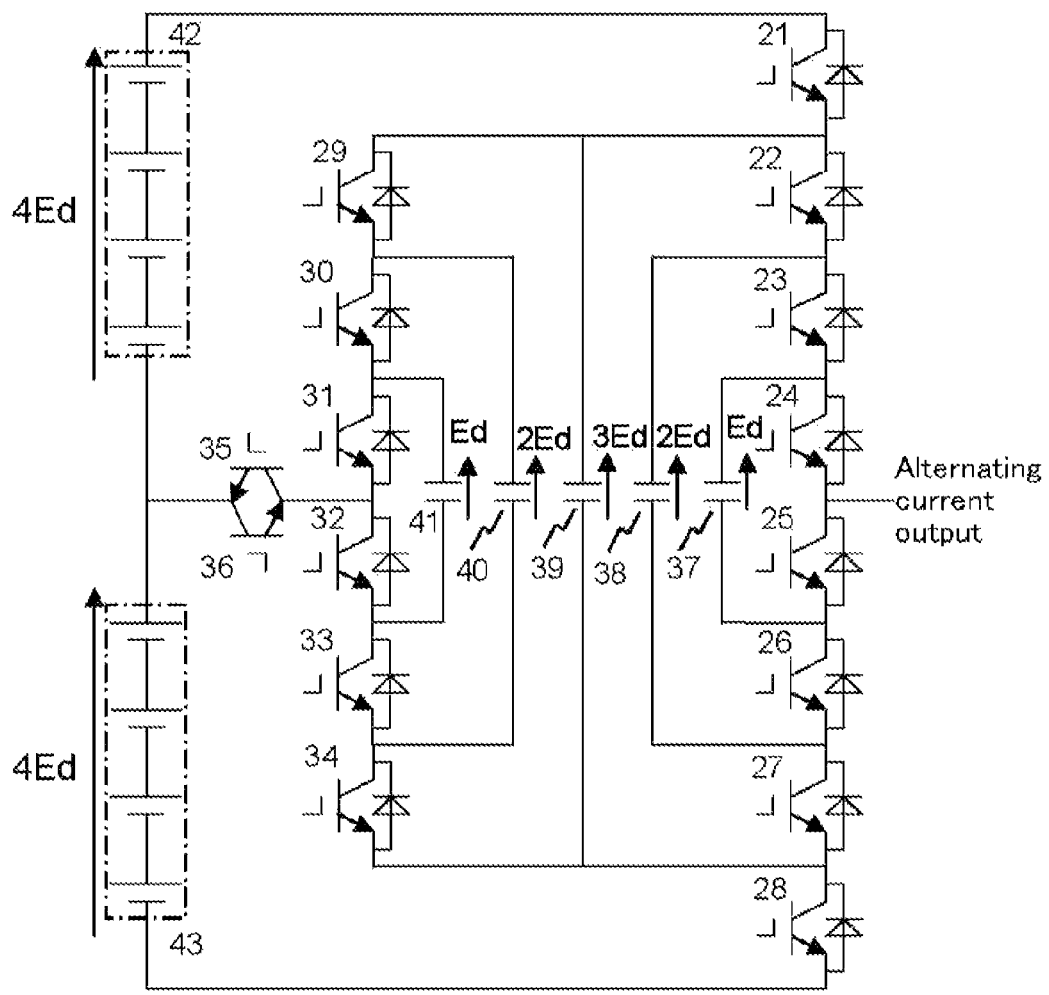
FIG. 4 is a circuit diagram showing a second example of the invention.

FIG. 4 shows a second example. This is an example of a power converter circuit that generates an alternating current output voltage configured of nine levels of voltage waveform from a series connection circuit of two direct current power supplies providing 4Ed (4 units) of voltage. It is a configuration example wherein IGBTs are used as semiconductor switches.

While the basic circuit configuration is the same as that in FIG. 1, the configuration is such that, in a second semiconductor switch series connection circuit wherein IGBTs 29 to 34 are connected in series, a capacitor 40 is connected between a connection point of the IGBTs 29 and 30 and a connection point of the IGBTs 33 and 34, and a capacitor 41 is connected between a connection point of the IGBTs 30 and 31 and a connection point of the IGBTs 32 and 33. Also, in a first semiconductor switch series connection circuit wherein IGBTs 21 to 28 are connected in series, capacitors 39 and 38 and a capacitor 37 are connected with the same configuration as in the second semiconductor switch series connection circuit.

Figure 6:
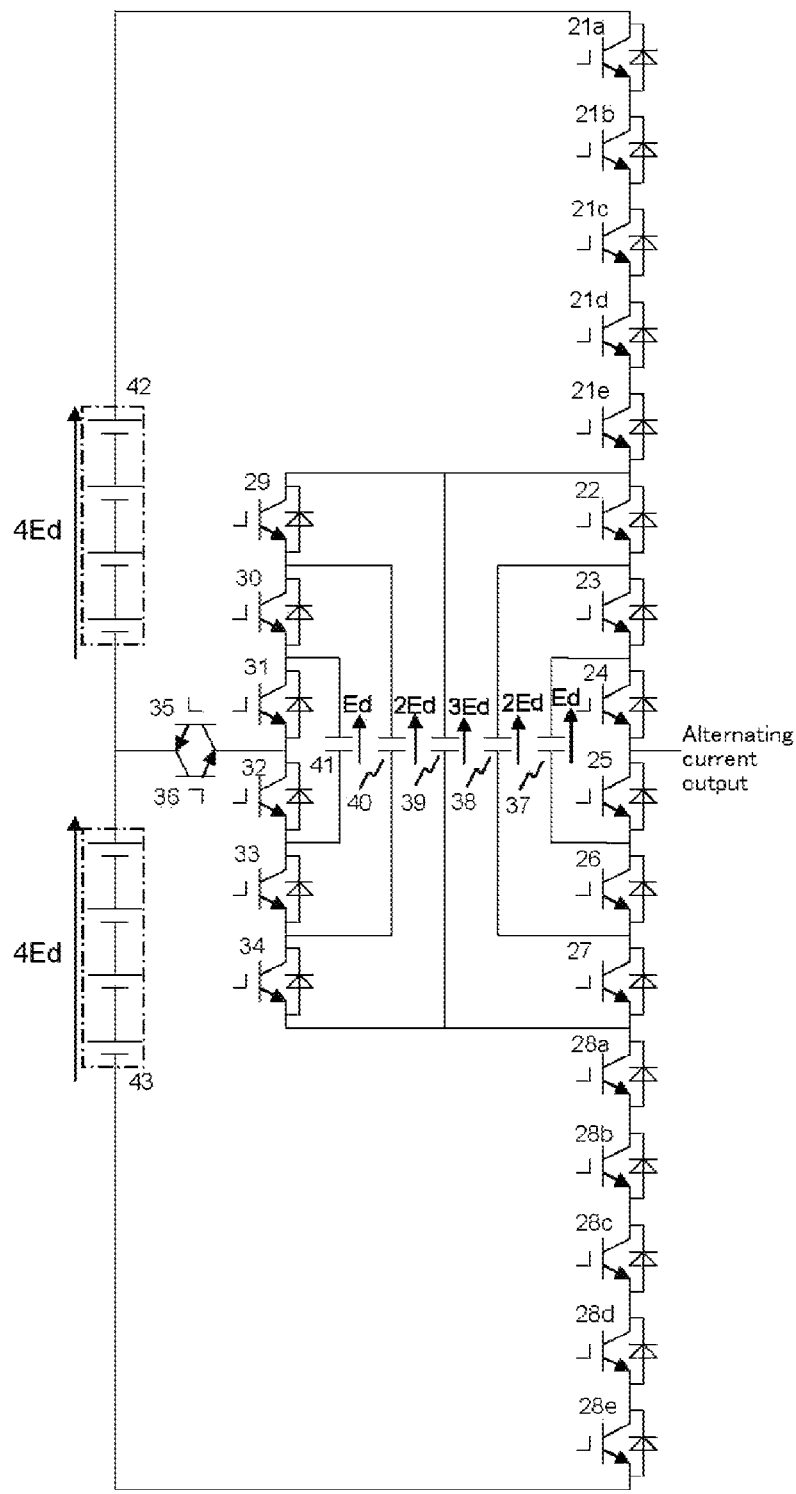
FIG. 6 is a modification example of the second example of the invention.
Figure 7:
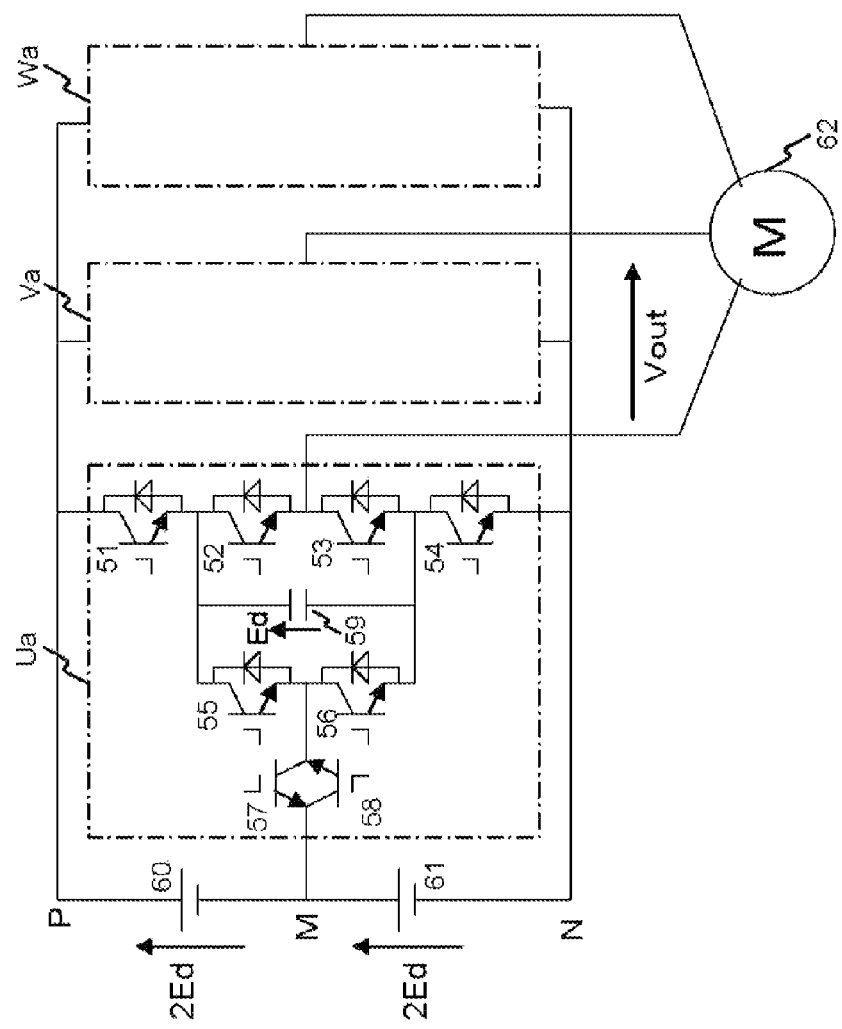
FIG. 7 is a circuit example of a five level inverter showing a heretofore known example.

FIG. 6 shows a modification example of the second example (the nine level power converter circuit) when the breakdown voltages of the IGBTs applied are all equal. This configuration is a configuration wherein the IGBT 21 in FIG. 4 is changed to a five switch series connection circuit of IGBTs 21a to 21e, and the IGBT 28 is changed to a five switch series connection circuit of IGBTs 28a to 28e.

Based on this basic configuration, it is also possible to realize a multilevel converter circuit of 11 levels or more.

In the heretofore described example, an example has been described for when the voltage change when switching is one unit (Ed) of direct current voltage, but when a plurality of units of change is allowed, it goes without saying that the number of semiconductor switch series connections and the number of capacitors used can be changed.

In the example, a description has been given of an inverter circuit that converts direct current to alternating current, but it goes without saying that the invention can also be applied in the same way to a converter circuit that converts alternating current to direct current.

Also, the example described uses IGBTs as the semiconductor switches of the circuit example, but the invention can also be realized with MOSFETs, GTOs, or the like.

Also, the configuration of the IGBTs 1, 6, 21, and 28 in FIG. 5 and FIG. 6 can also be realized in the same way by applying elements with a breakdown voltage two times or three times that of the other semiconductor devices, thereby reducing the number of series elements.

INDUSTRIAL APPLICABILITY

The invention is power converter circuit technology relating to an inverter circuit with a high breakdown voltage that generates an alternating current voltage with few low-order harmonics from a small number of serially connected direct current power supplies, and to a direct current power supply circuit that generates a low direct current voltage from a high voltage alternating current power supply while reducing the distortion of an alternating current waveform, and can be applied to a high voltage motor drive inverter, a system connection inverter, and the like.

The invention claimed is:

1. A multilevel power converter circuit that converts from direct current to alternating current comprising:
   a direct current power supply series circuit including first and second direct current power supplies connected in series, the direct current power supply series circuit having a positive terminal, a negative terminal and an intermediate potential point, the intermediate potential point being at a junction of the first and second direct current power supplies;
   a first semiconductor switch series circuit connected between the positive terminal and negative terminal of the direct current power supply series circuit, and a second semiconductor switch series circuit connected between an emitter of a $1^{st}$ first semiconductor switch of the first semiconductor switch series circuit and a collector of a $2n^{th}$ first semiconductor switch of the first semiconductor switch series circuit, n being an integer of 3 or higher;
   the first semiconductor switch series circuit including 2n first semiconductor switches connected in series with each other, and first diodes connected in anti-parallel with each of said first semiconductor switches;
   n−1 first capacitors, one first capacitor connected between a collector of the $n^{th}$ first semiconductor switch of the first semiconductor switch series circuit and an emitter of the $(n+1)^{th}$ first semiconductor switch of the first semiconductor switch series circuit, and another first capacitor connected between a collector of the $(n-m)^{th}$ first semiconductor switch of the first semiconductor switch series circuit and an emitter of the $(n+m+1)^{th}$ first semiconductor switch of the first semiconductor switch series circuit, wherein m is an integer of from 1 to n−2;

the second semiconductor switch series circuit including 2n−2 second semiconductor switches connected in series with each other and second diodes connected in anti-parallel with each of said second semiconductor switches;

n−2 second capacitors, one second capacitor connected between a collector of the $(n-1)^{th}$ second semiconductor switch of the second semiconductor switch series circuit and an emitter of the $n^{th}$ second semiconductor switch of the second semiconductor switch series circuit and, when n is 4 or higher, another second capacitor connected between a collector of the $(n-m)^{th}$ second semiconductor switch of the second semiconductor switch series circuit and an emitter of the $(n+m-1)^{th}$ second semiconductor switch of the second semiconductor switch series circuit; and a bidirectional switch connected between an emitter of the $n^{th}$ first semiconductor switch of the first semiconductor switch series circuit and the intermediate potential point of the direct current power supply series circuit.

2. The multilevel power converter circuit according to claim 1, having 2n+1 levels of voltage change.

3. The multilevel power converter circuit according to claim 2, wherein the $1^{st}$ first semiconductor switch of the first semiconductor switch series circuit includes a plurality of switches connected in series.

4. The multilevel power converter circuit according to claim 2, wherein the $2n^{th}$ first semiconductor switch of the first semiconductor switch series circuit includes a plurality of switches connected in series.

5. The multilevel power converter circuit according to claim 1, wherein the $1^{st}$ first semiconductor switch of the first semiconductor switch series circuit includes a plurality of switches connected in series.

6. The multilevel power converter circuit according to claim 1, wherein the $2n^{th}$ first semiconductor switch of the first semiconductor switch series circuit includes a plurality of switches connected in series.

7. A multilevel power converter circuit that converts from direct current to alternating current, comprising:

a direct current power supply series circuit including first and second direct current power supplies connected in series, the direct current power supply series circuit having a positive terminal, a negative terminal and an intermediate potential point, the intermediate potential point being at a junction of the first and second direct current power supplies;

a first semiconductor switch series circuit connected between the positive terminal and negative terminal of the direct current power supply series circuit, and a second semiconductor switch series circuit connected between an emitter of a $1^{st}$ first semiconductor switch of the first semiconductor switch series circuit and a collector of a $2n^{th}$ first semiconductor switch of the first semiconductor switch series circuit, n being an integer of 3 or higher;

a bidirectional switch connected between an emitter of the $n^{th}$ first semiconductor switch of the first semiconductor switch series circuit and the intermediate potential point of the direct current power supply series circuit;

the first semiconductor switch series circuit including 2n first semiconductor switches connected in series with each other and the second semiconductor switch series circuit including 2n−2 second semiconductor switches connected in series with each other;

n−1 first capacitors, one first capacitor connected between a collector of the $n^{th}$ first semiconductor switch of the first semiconductor switch series circuit and an emitter of the $(n+1)^{th}$ first semiconductor switch of the first semiconductor switch series circuit, and another first capacitor connected between a collector of the $(n-m)^{th}$ first semiconductor switch of the first semiconductor switch series circuit and an emitter of the $(n+m+1)^{th}$ first semiconductor switch of the first semiconductor switch series circuit, wherein m is an integer of from 1 to n−2; and n−2 second capacitors, one second capacitor connected between a collector of the $(n-1)^{th}$ second semiconductor switch of the second semiconductor switch series circuit and an emitter of the $n^{th}$ second semiconductor switch of the second semiconductor switch series circuit and, when n is 4 or higher, another second capacitor connected between a collector of the $(n-m)^{th}$ second semiconductor switch of the second semiconductor switch series circuit and an emitter of the $(n+m-1)^{th}$ second semiconductor switch of the second semiconductor switch series circuit.

* * * * *